(No Model.)
C. A. SEELEY.
DYNAMO AND MAGNETO ELECTRIC MACHINE.
No. 271,928. Patented Feb. 6, 1883.
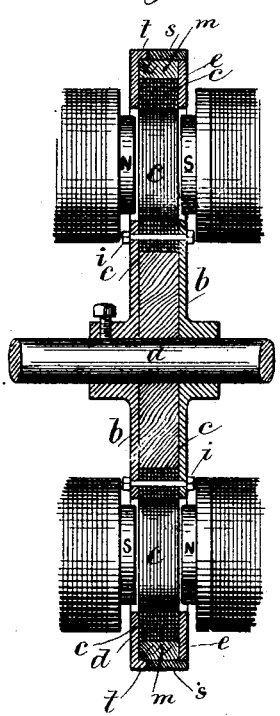
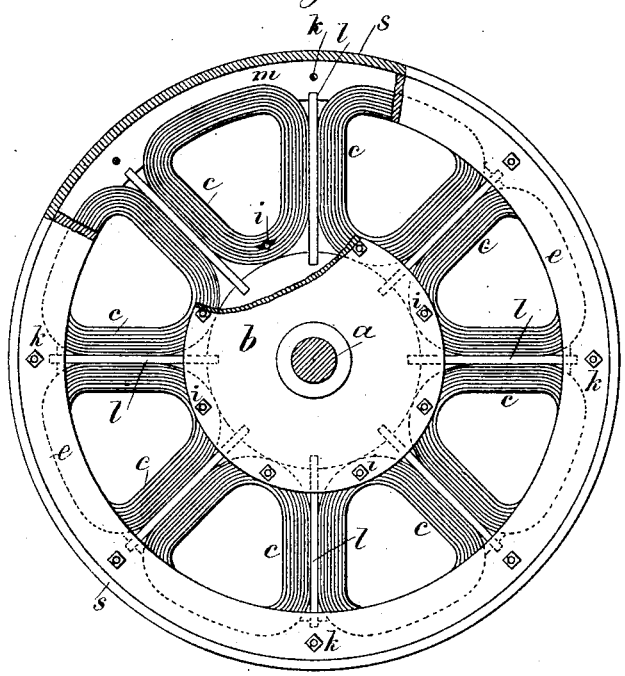
Witnesses
Chas. H. Smith
J. Haib
Inventor
Charles A. Seeley
by Lemuel W. Serrell
atty

UNITED STATES PATENT OFFICE.

CHARLES A. SEELEY, OF NEW YORK, N. Y.

DYNAMO AND MAGNETO ELECTRIC MACHINE.

SPECIFICATION forming part of Letters Patent No. 271,928, dated February 6, 1883.

Application filed November 1, 1882. (No model.)

*To all whom it may concern:*

Be it known that I, CHARLES A. SEELEY, of the city and State of New York, have invented an Improvement in Dynamo and Magneto Electric Machines, of which the following is a specification.

This invention relates to an armature-wheel with helices and without any iron cores to such armature-wheel; and it consists in the peculiar sectoral armature-coils, and in the combination, with such sectoral helices, of radial braces between one sectoral helix and the next, the same being of wood or other suitable material, and I employ clamping-rings at the inner and outer portions of the helices, so as to hold the said helices properly in place. The radial braces aid in holding the helices in a proper position in relation to each other and to the entire wheel; and I also employ a tire around the wheel to strengthen the parts and to prevent injury to the wheel by centrifugal action.

In the drawings, Figure 1 represents the armature-wheel, partially in section; and Fig. 2 is a cross-section of the wheel, showing, also, the position of the field-magnets.

The armature-wheel is composed of a shaft, $a$, upon which there are clamping-rings $b$ for securing the inner portions of the sectoral coils $c$ by bolts $i$, passing through the rings and between the wires. These clamping-rings are similar to those in my patent, No. 229,191. These sectoral coils are connected up in closed circuit with branch wires to the commutator-plates; or else the sectoral coils may be connected so that there are two free ends to be taken to commutator-plates or conductors, the currents being either in one direction or alternating in polarity, according to the manner in which the connections are made. The connections to the commutator-plates and circuits, being of known character, do not require further description. In order to secure these sectoral coils firmly in place, I use the clamping-rings $d$ $e$, with bolts $k$ passing through them and between the coils, similar to those in my aforesaid patent, No. 229,191, and I find it important to secure the coils firmly, in order that they may not be displaced by the centrifugal action, and for this purpose I use radial filling-braces, of wood or other suitable material, between the respective coils, as at $l$ $l$. These braces may be single pieces or open work—like braced trusses—and they determine the distance between the rim of the wheel and the hub. In some cases I saw out a wooden rim, $m$, to fit around the outer edges of the coils, and also between them, so as to form recesses for the reception of the coils. The bolts $k$, that clamp the rings $d$ $e$, also secure the radial braces.

In order to tie the respective parts of the armature-wheel together, I employ a tire surrounding the armature-wheel, said tire being either a separate metal band, as shown at $s$, or else inward circular flanges on the edges of the rings $d$, as shown at $t$.

The field-magnets N S are placed at opposite sides of the armature-wheel. The circuit-connections are to be of any usual character, and the shaft $a$ is to be supported in suitable bearings and rotated by power.

This armature-wheel is available in magneto or dynamo electric generators, and may be used with either single or double field-magnets.

I claim as my invention—

1. An armature-wheel having coils wound sectorally, in combination with radial braces between the coils, a shaft, clamping-rings at the hub, and clamping-rings around the circumferential portions of the coils, substantially as set forth.

2. An armature-wheel having coils wound sectorally, in combination with clamping-rings to secure the helices and a tire around the armature-wheel, substantially as set forth.

3. The combination, in an armature-wheel having no iron cores, of coils wound sectorally and placed near each other, with the adjacent portions of the coils parallel, or nearly so, substantially as set forth.

Signed by me this 31st day of October, A. D. 1882.

CHARLES A. SEELEY.

Witnesses:
GEO. T. PINCKNEY,
CHAS. H. SMITH.